Aug. 11, 1953
W. M. HALL ET AL
2,648,760
HEATING APPARATUS
Filed Sept. 21, 1950
2 Sheets-Sheet 1
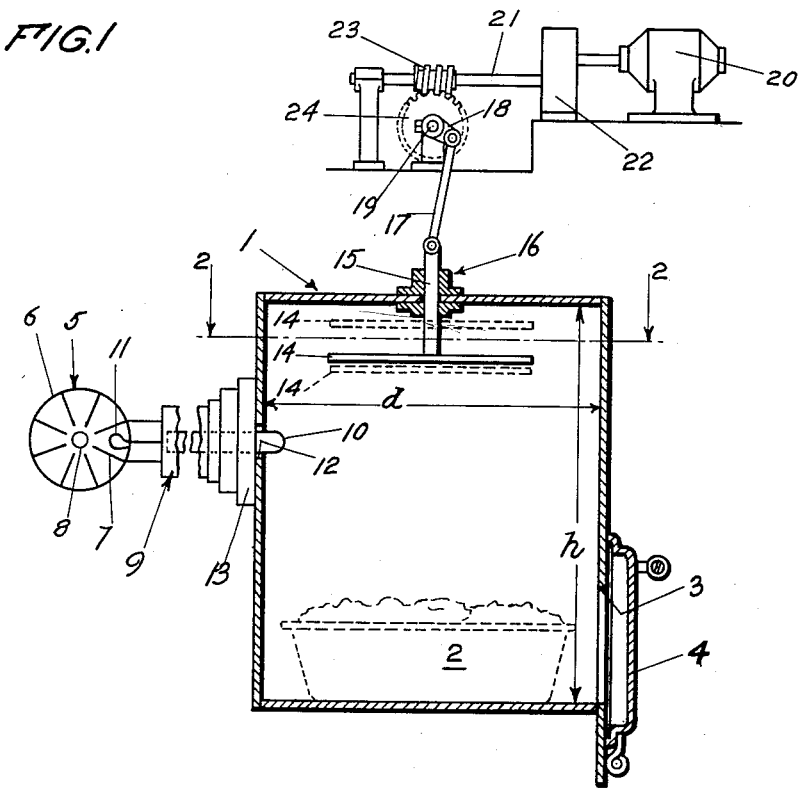
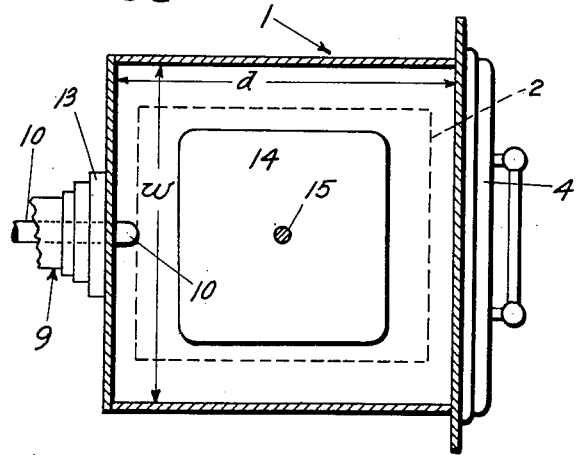
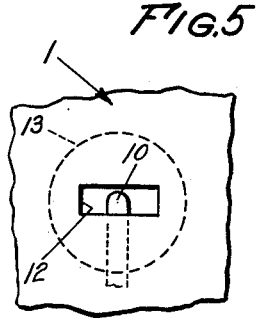
INVENTORS
WILLIAM M. HALL
FRITZ A. GROSS
BY Elmer J. Gorn
ATTORNEY Aug. 11, 1953    W. M. HALL ET AL    2,648,760
HEATING APPARATUS Filed Sept. 21, 1950    2 Sheets-Sheet 2

INVENTORS
WILLIAM M. HALL
FRITZ A. GROSS

BY Elmer J. Gorn
ATTORNEY

Patented Aug. 11, 1953

2,648,760

UNITED STATES PATENT OFFICE 2,648,760

HEATING APPARATUS

William M. Hall, Lexington, and Fritz A. Gross, Weston, Mass., assignors to Raytheon Manufacturing Company, Newton, Mass., a corporation of Delaware Application September 21, 1950, Serial No. 186,050

5 Claims. (Cl. 219—47)

This is a continuation-in-part of copending application, Ser. No. 721,540, filed January 11, 1947, now Patent No. 2,618,735.

This invention relates to heating apparatus, and more particularly to a microwave heater including a microwave-energy-filled region of space which is of substantial size as compared to the wave length of the microwave energy.

One object of this invention is to devise apparatus for improving the efficiency and uniformity of the distribution of microwave energy in a cooking device.

A second object is to devise apparatus for producing a substantially uniform integrated radio-frequency heat pattern in a cooking device.

Another object is to devise apparatus for cooking large volumes of food with the expenditure of a minimum amount of input power.

A further object is to devise means for producing periodic changes in the field distribution in a radio-frequency cavity, whereby the integrated heating effect of the field is made substantially uniform.

A still further object is to devise means for continuously changing the mode of the waves in a radio-frequency cavity, whereby the changing complex modes produce a substantially uniform overall heating effect therein.

An additional object is to provide a microwave cooking device in which food masses, whose linear dimensions are large compared to the wave length of the microwave energy used, may be cooked in a substantially uniform manner.

Still another object is to accomplish the above objects in a simple yet effective manner.

The foregoing and other objects of the invention will be best understood from the following description of some exemplifications thereof, reference being had to the accompanying drawings, wherein:

Fig. 1 is a vertical sectional view through a microwave cooker embodying the invention;

Fig. 2 is a section taken along line 2—2 of Fig. 1 and looking in the direction of the arrows;

Fig. 5 is an elevation looking at the rear wall of the oven of Figs. 3 and 4 from the inside thereof.

Figure 3:
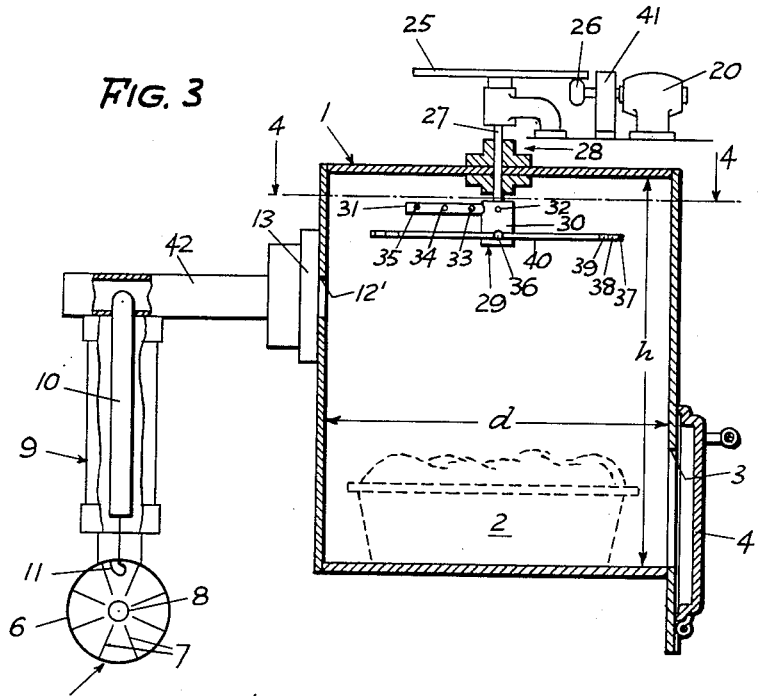
Fig. 3 is a view similar to Fig. 1 of a modified cooker.

In microwave cooking devices, the problem arises of cooking foodstuffs having a rather large total area or volume. In order to accomplish this result, it is necessary to energize large regions of space with microwave energy, and for proper cooking this energization should be substantially uniform throughout the space. Also, it is desirable to accomplish such energization with a minimum expenditure of power.

In such a space the wave length of the microwave energy is small in comparison to the linear dimensions of the oven, or in comparison to the linear dimensions of the food mass to be cooked or heated.

At any single frequency only one mode of oscillation can exist in such a space. In other words, there can be only one distribution of regions of high electric field intensity and regions of high magnetic intensity. Unless the walls are made highly absorbing so that substantially all incident radiation is absorbed, the differences in field intensity will be very great. The problem presented, therefore, is to minimize or eliminate the effect that such field distribution may have on the heating of the material to be cooked.

The electrical load which is presented to the source will, in general, change if this field distribution changes. This will occur if the frequency of the source is changed or if the quantity or nature of the food which is being heated is changed.

Referring now to the drawings, and more particularly to Figs. 1 and 2 thereof, a hollow rectangular prismoidal enclosure or cavity 1 is made of a suitable metal and has rather thin walls as shown; enclosure 1 is adapted to serve as the oven of the heating or cooking apparatus. A container 2 of food may be placed inside oven 1, said container resting on the bottom wall of the oven or being placed in any other suitable position therein while the food is being cooked. In order to allow access to the interior of the oven for placing the food therein and for removing the food therefrom, a rectangular opening 3 is provided in the front wall of the oven 1, this opening being closable by means of a hinged metal door 4. When door 4 is closed, the enclosure 1 is entirely closed, except for an opening 12 for the exciting means to be described hereinafter. Cavity 1 has an internal width $w$, an internal height $h$, and an internal depth $d$.

Numeral 5 generally designates an electron-discharge device of the magnetron type, which includes, for example, an evacuated envelope 6, made of highly conductive material, such as copper, and provided with a plurality of inwardly-directed, radially-disposed anode vanes 7. The arrangement is such that each pair of adjacent anode vanes 7 forms, together with that portion of the envelope lying therebetween, a cavity resonator whose natural resonant frequency is, as is well known to those skilled in the art, a function of the geometry of the physical elements making up the same. For the purposes of the present invention it is desirable that the dimensions of each such cavity resonator be such that the wave length of the electrical oscillations adapted to be generated therein has a predetermined value, for example, of the order of ten centimeters. Wave lengths of this order lie in the microwave region of the frequency spectrum. However, this invention is equally applicable to radio-frequency energy of longer or shorter wave lengths within or without the microwave region.

Centrally located in envelope 6 is a highly electron-emissive cathode member 8, for example, of the well-known alkaline-earth metal oxide type, said cathode member being provided with conventional means (not shown) for raising the temperature thereof to a level sufficient for thermionic emission.

The electron-discharge device 5 is completed by magnetic means (not shown) for establishing a magnetic field in a direction transversely of the electron path between the cathode and anode members thereof.

Magnetron 5 is energized from any suitable source (not shown) and when so energized delivers high-frequency electromagnetic energy having a predetermined wave length to a co-axial transmission line 9, the inner conductor 10 of which is coupled to oscillator 5 by a loop 11 and the outer conductor of which is connected to envelope 6. The inner conductor 10 of line 9 extends directly into the interior of oven 1 through a suitable opening 12 provided in the rear wall thereof, while the outer conductor of said line is connected to the rear wall of the oven 1 by a suitable fastening means 13.

By making the height $h$, width $w$, and depth $d$ of the oven space different from each other, for example, by one quarter wave length, and feeding power into the oven at a point displaced slightly from the center of one surface, the number of different modes which will exist in a given range of frequencies can be made somewhat greater than it would be if the oven were entirely symmetrical. This will tend to make the operation of the oven more uniform if the source is to operate at different frequencies. The dimensions $w$, $h$, and $d$ of enclosure or cavity 1 are all large compared to the wave length of the oscillations of oscillator 5, as stated above, and are all different. For example, $w$ may be 13 inches, $d$ may be 14 inches, and $h$ may be 15 inches.

For any given frequency of operation, however, the unique distribution of field maxima and minima still exists. Making the oven irregular in shape does not change this condition and therefore some other means must be resorted to. Moreover, it has been found that great irregularities of the surfaces of the oven, for example, deep corrugations, tend to increase the difficulty of providing uniform heating of food samples. For decreasing the difficulty of providing uniform heating, it has been found desirable to introduce the radio-frequency more or less symmetrically into the oven, rather than from one corner, for example. Opening 12 is therefore preferably centered with respect to the vertical side walls of the oven, as shown in Fig. 2, and is preferably somewhat above the horizontal midplane of the oven, as shown in Fig. 1.

In order to provide uniform heating in the oven, it has been found satisfactory to move the food about in the oven so that all parts of the food are exposed to many different regions in the oven and the effects of the different field intensities are averaged out. It is within the scope of this invention to provide uniform heating of a body in the oven by moving said body with respect to the oven.

Another expedient which has been found satisfactory is to change the boundary conditions of the oven, thereby changing the field distribution. This can be accomplished without moving the side walls by introducing into the oven an additional reflecting or dielectric object which can then be moved about, causing a change in field distribution within the confined space.

One possible type of reflecting object is shown in Figs. 1 and 2. A thin metallic plate member 14, which may have substantially square upper and lower faces, as shown in Fig. 2, is mounted horizontally inside cavity 1 near the upper end thereof. The dimensions of the faces of this plate member are somewhat smaller than the corresponding dimensions $d$ and $w$ of the oven, but the face dimensions of the plate are each a substantial proportion of the corresponding oven dimensions, such as on the order of three-fourths thereof, for example. Plate 14 is fixed to a shaft 15 which extends through the upper wall of oven 1 by means of a hole in the central area thereof. Shaft 15 is mounted, for vertical reciprocation with respect to oven 1, in a suitable bearing 16 fixed to the top wall of said oven.

Shaft 15 is adapted to be continuously reciprocated vertically, thereby continuously reciprocating or moving plate 14 between the upper and lower dotted-line positions shown in Fig. 1. In order to reciprocate shaft 15 vertically, one end of a link 17 is pinned to the upper end of said shaft, the other end of said link being similarly pinned to the outer end of a crank arm 18 which is keyed to a shaft 19. A motor 20 rotates a shaft 21 through a speed-reducing mechanism 22. A worm 23 is keyed to shaft 21 and drives a worm wheel 24 keyed to shaft 19 to rotate said latter shaft and vertically reciprocate shaft 15 and plate 14 at any desired relatively slow rate of reciprocation. This rate may be on the order of 75 oscillations per minute, for example.

It will be apparent that, as metallic plate 14 is vertically reciprocated, in effect the internal height $h$ of cavity 1 is continuously and periodically varied to a predetermined extent, since metallic plate 14 "looks" like the upper wall of enclosure 1 to the high-frequency electromagnetic waves inside the cavity.

Microwave energy is fed by coaxial line 9 and exciting probe or rod 10, from magnetron oscillator 5 to the interior of oven 1. It has been found that a large oven of the above-described type, containing such a moving plate-like member therein and excited by microwave energy from source 5 in the above-described manner, produces a very uniform overall or integrated radio-frequency heat pattern throughout the entire interior of enclosure 1. It is not known exactly how or why this result is accomplished, but our present understanding of the theory of operation is substantially as follows.

Due to the relatively large dimensions of cavity 1 with respect to the wave length of the radio-frequency energy, such energy supplied to the interior of the cavity is reflected back and forth in various directions by the inner walls thereof to establish a complex-mode radio-frequency field pattern in the cavity or enclosure. Because of the large dimensions of the cavity with respect to the wave length of the energy supplied, a plurality of nodes and loops appear in the standing-wave system set up within the cavity, producing a high-order mode or complex-mode pattern in said cavity, said pattern filling the entire volume of the enclosure in a more or less uniform manner. The cavity 1, due to its substantial dimensions with respect to the wave length, is a high-Q cavity, which means that there is a large amount of circulating (reactive) power within the cavity, setting up a high standing wave ratio in the oven which utilizes the expended power in a very efficient manner for heating purposes.

The effective dimension $h$ is periodically varied by the movements of plate 14, as described above. Due to these periodic changes of the effective internal dimensions of cavity 1, the field distribution therein is changed periodically because of the change in the distance which must be traveled by the waves before reflection from plate member 14. The radio-frequency field pattern or field distribution in the cavity is therefore changed periodically; in other words, the mode present in the cavity is changed periodically with the periodic reciprocation of plate member 14, thus in effect "stirring up" the microwave energy in the cavity. Therefore the device may be termed a "stirrer" or "mode changer."

Since the field distribution, or the mode pattern, inside the cavity is periodically changing, and since there is a complex mode pattern inside the cavity, the total or integrated heat provided in any one area of the cavity during a period of time will be substantially the same as that provided in any other equal area of the cavity during the same time, no matter where in the cavity the two comparable areas are located. Due to this heat uniformity, the oven is made very effective for cooking purposes.

It is also within the scope of this invention to change the field distribution in the cavity 1 by frequency-modulating the output of magnetron 5, thus changing the wave mode in the cavity by effectively changing the dimensions of the cavity with respect to the wave length of the oscillations supplied thereto.

Figure 4:
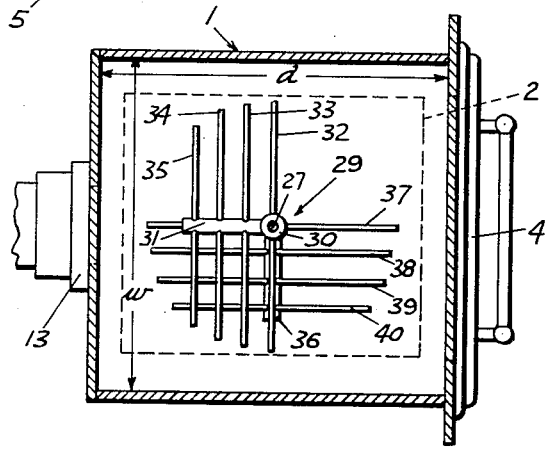
Fig. 4 is a section taken along line 4—4 of Fig. 3.

Now referring to Figs. 3–5, these figures show a modified reflecting-object type of mode changer or stirrer or field-distribution-changer, together with a modified feed line between the magnetron and the cavity. In Figs. 3–5, the same reference numerals are used for elements corresponding to those of Figs. 1–2.

In this modification, magnetron 5 when energized delivers high-frequency electromagnetic waves to a hollow rectangular wave guide 42 through a coaxial transmission line 9 which is coupled to oscillator 5 by loop 11. The central conductor 10 of line 9 extends into the interior of wave guide 42 near one end thereof, through an opening provided in the center of the longer side of said guide, to serve as an exciting rod or exciting probe for said guide.

The end of guide 42 nearest this exciting rod is closed, while the opposite end of said guide is fastened to the rear wall of enclosure 1 by fastening means 13 and is open. The interior of guide 42 is placed in energy-transmitting relationship with the interior of the cavity 1 by means of a rectangular aperture 12' provided in the rear wall of said cavity, this aperture being of the same size and configuration as the interior of guide 42 and being aligned with said guide to place the interior of said guide in communication with the interior of cavity 1. Aperture 12' is located in a central position with respect to the vertical side walls of oven 1 and is preferably located above the horizontal midplane of oven 1.

If desired, the interior of wave guide 42 may be sealed off or masked from the interior of oven 1 by means of a plate of a material which is transparent to microwave energy but is not transparent to solids, liquids, or gases, such as "Pyrex" or quartz, for example, in accordance with the principles disclosed in the copending application of Norman R. Wild, Serial No. 709,987, filed November 15, 1946, now Patent No. 2,599,033, dated June 3, 1952. Such a plate could be placed in a position covering and sealing the open (oven) end of guide 42 to keep undesirable food vapors and steam out of said guide, as explained in said Wild application.

A motor 20, through a speed reducer 41, drives a disk 25 by means of a friction wheel 26. Disk 25 is keyed to a shaft 27, which extends through a suitable bearing 28, in which said shaft is journaled for rotation, into the interior of oven 1 through an aperture provided centrally in the top wall of said oven. Shaft 27 is continuously rotated by motor 20 through the above-described mechanism.

Fastened to the lower end of shaft 27 is a metallic grid-like stirrer structure indicated generally by 29. A sleeve 30 is fastened to the lower end of shaft 27. An upper support rod 31 is integral with sleeve 30 and the axis of said rod extends radially from sleeve 30, so that said rod is horizontal. Four parallel rods 32, 33, 34 and 35, of smaller diameter than rod 31, have their parallel axes lying in the same horizontal plane and perpendicular to the axis of rod 31. The longest rod 32 of these four rods is integral with sleeve 30 and represents the diameter of a semi-circle, said diameter being on the order of ten inches, for example; the other rods 33—35 are integral with rod 31 and have lengths corresponding to chords of said semi-circle; the axis of rod 31 is collinear with the radius of said semi-circle. The axis of rod 31, as well as the axes of rods 32—35, are preferably spaced a distance on the order of a quarter to a half-wave length from the top wall of the cavity 1. The axes of rods 31—35 lie in a common horizontal plane. The above-described rods 31—35 constitute the upper half or upper grid of stirrer structure 29.

The lower half or lower grid of said stirrer structure is exactly like the upper half previously described, and consists of support rod 36, four chordal rods 37—40 whose axes are perpendicular to the axis of rod 36, the axes of all the rods 36—40 being horizontal but the axes of rods 37—40 being perpendicular to the axis of rod 36. The only difference between the upper and lower halves of structure 29 is that the lower half 36—40 is displaced 90 degrees in azimuth with respect to the upper half, so that the axes of rods 31 and 36 lie at right angles to each other, and the axes of rods 37—40 lie at right angles to the axes of rods 32—35.

The axes of the rods 36—40 of the lower half of the stirrer structure 29 lie in a common horizontal plane, this plane being spaced approximately a quarter-wave length below the horizontal plane in which the axes of rods 31—35 lie.

The exciting rod of guide 42 is arranged to set up TE$_{0,1}$ mode waves therein, as will be apparent to those skilled in the art. These waves propagate down the wave guide and emanate from the open end thereof into the cavity 1. It has been found that a large oven of the above-described type, containing therein such a rotating grid-like "stirrer structure" and excited by microwave energy from source 5 in the above-described manner, produces a very uniform overall or integrated radio-frequency heat pattern throughout the entire interior of enclosure 1, due to its "stirring" action. It is not known exactly how or why this result is accomplished, but our present understanding of the theory of operation of this modification is substantially is follows.

Cavity 1, as in the previous embodiment, has linear dimensions which are large compared to the wave length of the radio-frequency energy, so that a complex-mode radio-frequency field pattern is established in the enclosure or cavity, said pattern filling the entire volume of the enclosure in a more or less uniform manner, said cavity utilizing the input power thereto very efficiently because of the high Q thereof.

Considering the stirrer structure 29 in the particular momentary position of Fig. 4, in the first quadrant (algebraically speaking) there are no conducting rods whatever, so that in this area both horizontal polarization components of the radio-frequency waves pass beyond the stirrer structure to the top wall of the oven and are reflected therefrom. In the second quadrant there are the conducting rods 32—35 extending from side to side of the oven parallel to dimension $w$, which rods act as a polarizer, permitting only the horizontal polarization component of the waves which is perpendicular to said rods (or parallel to dimension $d$) to pass through the stirrer structure in this area and reflecting from the stirrer structure the horizontal polarization component which is parallel to said rods (or parallel to dimension $w$). In the third quadrant, there are the conducting rods 37—40 extending from front to rear of the oven parallel to dimension $d$ and also the conducting rods 32—35 extending parallel to dimension $w$, the two sets of rods being spaced from each other. This structure causes both horizontal polarization components (that is, the one parallel to dimension $w$ and the one parallel to dimension $d$) to be reflected from the stirrer structure in this quadrant, permitting neither of these components to pass therethrough. Rods 32—35 reflect the component parallel to dimension $w$, while rods 37—40 reflect the component parallel to dimension $d$. In the fourth quadrant, there are the conducting rods 37—40 extending parallel to dimension $d$, which act to permit only the horizontal polarization component of the waves which is perpendicular to said rods (or parallel to dimension $w$) to pass through the stirrer structure in this area and to reflect from the stirrer structure the horizontal polarization component which is parallel to said rods (or parallel to dimension $d$).

From the above discussion, we see that there is a different polarization-reflection characteristic in each of the four quadrants of the stirrer structure; that is, in the first no waves are reflected by or from the stirrer structure, in the second the horizontal polarization component parallel to dimension $w$ is reflected by the stirrer structure, in the third both horizontal polarization components are reflected by the stirrer structure, and in the fourth the horizontal polarization component parallel to dimension $d$ is reflected by the stirrer structure. Of course, those components not reflected by or from the stirrer structure pass on therethrough and are reflected from the top wall of the oven. Therefore, a wave having both horizontal components of polarization will be differentially reflected by the stirrer structure in each of the four quadrants.

As the stirrer structure is rotated by motor 20, these different polarization-reflection characteristics will, of course, be varied or interchanged accordingly. Therefore, there will be continuously-varying polarization-reflection characteristics in each of the four quadrants, resulting in a continuous effective changing of the wave modes present in the enclosure, or a changing of the field distribution which is the "stirring" action. The integrated heat is thereby made substantially uniform throughout the cavity. This can be appreciated from the fact that waves which travel entirely through the stirrer structure before reflection travel distances different from those traveled by the waves which are reflected from and by the stirrer structure.

Of course, it is to be understood that this invention is not restricted to the particular details as described above, as many equivalents will suggest themselves to those skilled in the art. For example, each of the grids of the grid-like stirrer structure 29 could cover a complete circle instead of a semi-circle, without departing from the spirit and scope of the invention. In this case, the same polarization-reflection characteristics would be provided in all four quadrants, but by rotation of the stirrer structure these characteristics would be intermittently applicable to the four quadrants, thus giving an effective stirring action. Also, other types of stirring devices could be rotated or reciprocated within the oven to produce the desired effect. In addition, other types of mechanical driving means could be utilized for the stirring devices disclosed. Various other variations will suggest themselves. It is accordingly desired that the appended claims be given a broad interpretation commensurate with the scope of this invention within the art.

What is claimed is:

1. High-frequency apparatus comprising a metallic enclosure, means for supplying to said enclosure high-frequency electromagnetic waves having a predetermined wave length, the internal dimensions of said enclosure being large compared to said wave length, a rotatable metallic grid-like structure positioned in said enclosure, and means for moving said structure cyclically, said enclosure including means for enabling a body to be heated to be placed inside said enclosure.

2. High-frequency apparatus comprising a metallic enclosure, means for supplying to said enclosure high-frequency electromagnetic waves having a predetermined wave length, the internal dimensions of said enclosure being large compared to said wave length, a rotatable metallic grid-like structure positioned in said enclosure, and means for rotating said structure, said enclosure including means for enabling a body to be heated to be placed inside said enclosure.

3. High-frequency apparatus comprising a metallic enclosure, means for supplying to said enclosure high-frequency electromagnetic waves having a predetermined wave length, the internal dimenssions of said enclosure being large compared to said wave length, a first group of parallel coplanar metallic rods supported in said enclosure, a second group of parallel coplanar metallic rods supported in said enclosure, the axes of the rods of said first group extending at right angles to those of the rods of said second group, said two groups being spaced from each other by a substantial portion of a wave length and being fixed to a rotatable common support, and means for rotating said common support.

4. Heating apparatus comprising a metallic enclosure, means for generating high-frequency electromagnetic energy having a predetermined wave length, the internal dimensions of said enclosure being large compared to said wave length, means for coupling the energy output of said generating means to said enclosure to set up therein a predetermined electric field distribution pattern, a movable metallic grid-like structure positioned in said enclosure, and means for producing cyclical rotary motion of said structure, said enclosure including means for enabling a body to be heated to be placed inside said enclosure.

5. Heating apparatus comprising a metallic enclosure, means for generating high-frequency electromagnetic energy having a predetermined wave length, the internal dimensions of said enclosure being large compared to said wave length, means for coupling the energy output of said generating means to said enclosure to set up therein a predetermined electric field distribution pattern, a rotatable metallic grid-like structure positioned in said enclosure, and means for rotating said structure, said enclosure including means for enabling a body to be heated to be placed inside said enclosure.

WILLIAM M. HALL.
FRITZ A. GROSS.

References Cited in the file of this patent
UNITED STATES PATENTS

| Number | Name | Date |
|---|---|---|
| 2,370,161 | Hansen | Feb. 27, 1945 |
| 2,427,094 | Evans | Sept. 9, 1947 |
| 2,495,415 | Marshall | Jan. 24, 1950 |
| 2,500,752 | Hanson et al. | Mar. 14, 1950 |

OTHER REFERENCES 737,963 abstract published in O. G. of January 22, 1952.

Radar Electronics Fundamentals, NavShips 900,016 Bureau of Ships, Navy Dept., June 1944 (pages 382–384). (Copy in Div. 69.)

Physical Review, vol. 70, Numbers 5 and 6, September 1 and 15, 1946, pages 300–307, especially pages 301, 302, and 304. Article called "Water vapor absorption of electromagnetic radiation in the centimeter wave-length range," by Becker and Autler. Copy found in Div. 69.